A. WATKINS.
METHOD OF DETERMINING RELATIVE TIMES OF DEVELOPMENT OF PHOTOGRAPHIC PLATES AND FILMS FOR DIFFERENT TEMPERATURES.
APPLICATION FILED NOV. 29, 1909.
1,004,947.
Patented Oct. 3, 1911.
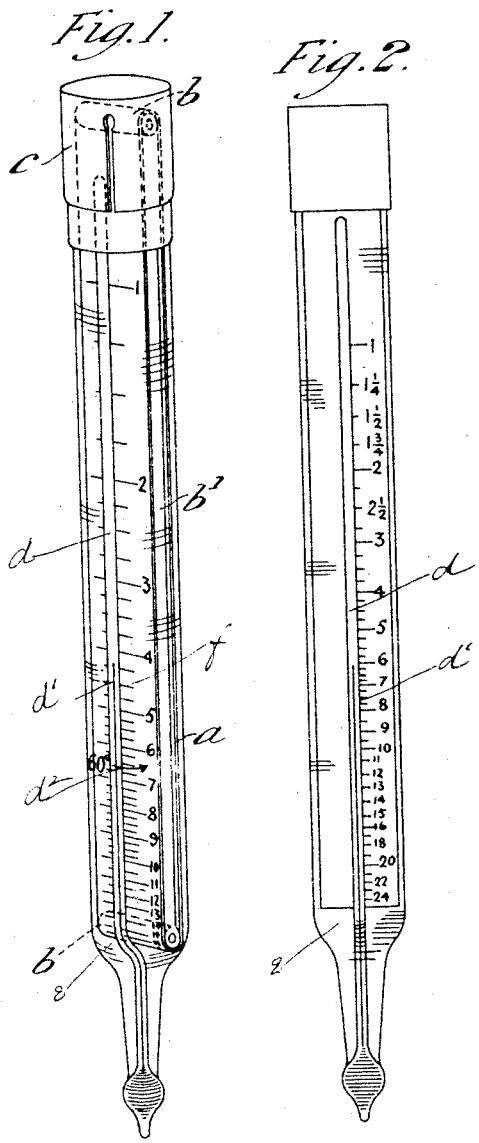

UNITED STATES PATENT OFFICE.

ALFRED WATKINS, OF THE IMPERIAL MILLS, HEREFORD, ENGLAND.

METHOD OF DETERMINING RELATIVE TIMES OF DEVELOPMENT OF PHOTOGRAPHIC PLATES AND FILMS FOR DIFFERENT TEMPERATURES.

1,004,947. Specification of Letters Patent. Patented Oct. 3, 1911.

Application filed November 29, 1909. Serial No. 530,299.

*To all whom it may concern:*

Be it known that I, ALFRED WATKINS, a subject of the King of Great Britain, residing at The Imperial Mills, Hereford, in the county of Hereford, England, photographic-apparatus manufacturer, have invented a certain new and useful Method of Determining Relative Times of Development of Photographic Plates and Films for Different Temperatures, of which the following is a specification.

In the specification of my United States Patent No. 933605 I have described apparatus for determining the relative times of development of photographic plates or films for different temperatures comprising two relatively movable slides, one bearing a temperature scale and the other a logarithmic scale, which scales are adjustable with respect to each other, and I have mentioned that a thermometer can be supplied as part of the apparatus, the scale of the thermometer itself in that case being used as a temperature scale. Since completing the said application I have discovered that it is not essential that the thermometer should bear a scale, and the present invention relates to a method of directly indicating the relative times of development of any photographic plates or films for different temperatures by means of the expansion of a fluid by modifying the apparatus described in the said specification in either of two ways. In the first form the thermometer bears a single mark thereon, which mark denotes a degree of temperature corresponding with which the proper time of development of a particular developer has been ascertained by experience, and the division on the relatively movable logarithmic scale denoting the said proper time of development is brought into register with the mark.

The invention will be explained with reference to the accompanying drawings, in which—

Figure 1 is a perspective view of one form of apparatus for determining the relative times of development according to the invention. Fig. 2 is a face view of a modified form of apparatus.

In Fig. 1 of the drawings $d$ is a thermometric tube containing fluid $d'$, and with the exception of the mark $d^2$ is ungraduated; the mark $d^2$, for instance, and by way of example, is assumed to be placed on the tube $d$ in a position indicating a temperature of 60°; $e$ is an outer tube inclosing the inner tube $d$; $f$ is a logarithmic scale of paper or other suitable material that bears a proper relation to the ordinary thermometric scale that would be suitable for the thermometric tube $d$. The mark $d^2$ being assumed at 60°, the logarithmic scale is set relatively to the tube $d$ so that the division on the scale denoting the pre-determined requisite time of development corresponding with the 60° temperature is in register with the mark $d^2$. In Fig. 1 this requisite time is assumed for example to be 6½ minutes. Should the temperature increase so that the fluid $d'$ rises to a height corresponding with a temperature of 80°, the reading on the logarithmic scale opposite the height of the fluid would, as shown in Fig. 1, then be 3¼ minutes for the same class of developer and plate.

The logarithmic scale is made adjustable by making it as an endless band $a$ passing over rollers $b$ mounted in a skeleton frame $b'$ and suspended in the tube $e$, the thermometer being provided with a cap $c$ which can be removed to operate this band by the fingers so that for other classes of plate, the setting of the scale can be adjusted and the readings varied accordingly.

The second form of construction illustrated in Fig. 2 of the drawing relates to an application of the same principle for use with the logarithmic scale fixed in relation to the thermometer and not movable. In this case a certain time of development correct for a plate and a fixed dilution of a stated developer is fixed in relation to the height of the fluid at a standard temperature. As the temperature increases or decreases, the fluid in the tube rises or descends, and the operator then reads off the time of development opposite the height of the fluid $e'$ in the tube $d'$ and uses that particular time. For example, as shown in the drawing, assume that the thermometer is so constructed that at a temperature of 60° the height of the mercury in the tube $d$ will be opposite 6¼ minutes development on the fixed logarithmic scale for a medium plate and that the temperature rises to 80°, the time on the logarithmic scale will be 3¼ minutes for the same class of plate and developer. This time of development will also be correct for other makes of plate with the same developer, provided that the dilution or concentration of the developer be so modified for the particular plate that the same development result is obtained in 6½ minutes at 60° as was attained with the plate and the developer for which the thermometer was first constructed, and these dilutions or concentrations of the developer for specific types of plates can be indicated in the instructions issued with the instrument and be printed on the back of the logarithmic scale or any other part of the thermometer.

When a scale is constructed entirely from experimental data, it may be found to depart somewhat from the logarithmic form, but it could still be used as part of this invention with sufficiently accurate results.

The logarithmic scale used in the above two constructions is prepared or calculated according to the instructions contained in the specification to my United States Patent No. 933605.

Having thus described the nature of my said invention and the best means I know of carrying the same into practical effect, I claim:—

1. Apparatus for directly indicating the length of time for the development of photographic plates or films by the expansion of a fluid, comprising a tube, fluid contained in the tube, the tube bearing a mark corresponding with the height of the fluid in the tube at a selected temperature, and a logarithmic scale having divisions representing periods of development, one of said divisions being adapted to be in register with the said mark, so that the height of the fluid at any temperature registers with the division on the scale representing the period of time for the development at that temperature, substantially as described.

2. Apparatus for directly indicating the length of time for the development of photographic plates or films by the expansion of a fluid, comprising an outer tube, an inner tube inclosed in the outer tube, fluid contained in the inner tube, the said inner tube bearing a mark corresponding with the height of the fluid in the tube at a selected temperature, a logarithmic scale movably mounted within the said tube, having divisions representing periods of development and adapted to be moved to bring any division thereon in register with the mark as and for the purpose described, so that the height of the fluid in the tube at a selected ters with the division on the scale representing the period of time for the development at that temperature, substantially as described.

In testimony whereof I have signed my name to this specification in the presence of two subscribing witnesses.

ALFRED WATKINS.

Witnesses:
JOSEPH THOMAS,
O. L. BRADLEY.